G. H. WARD.
COW STANCHION.
APPLICATION FILED SEPT. 19, 1916.
1,309,497.
Patented July 8, 1919.
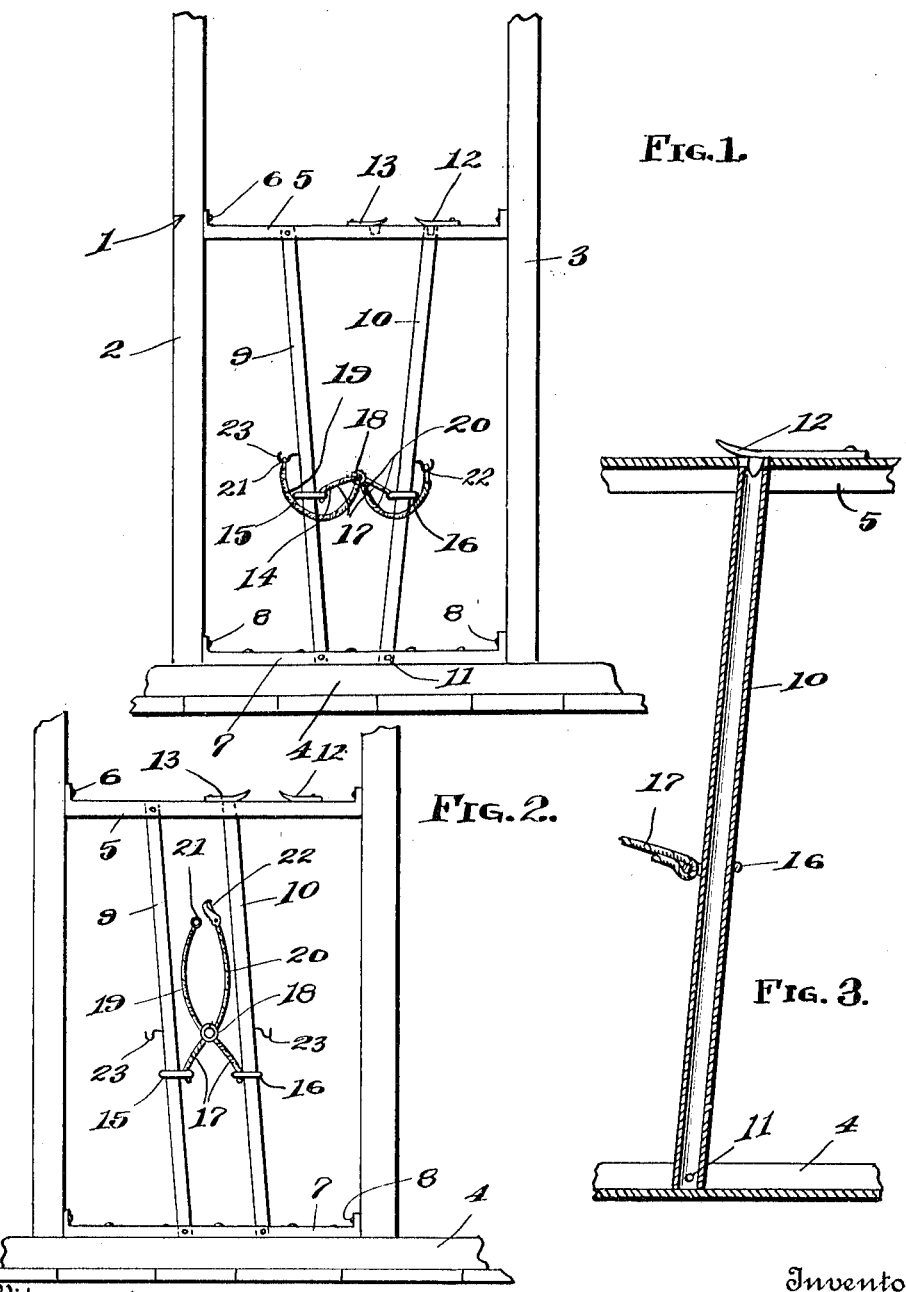

UNITED STATES PATENT OFFICE.

GARRET H. WARD, OF TILLAMOOK, OREGON.

COW-STANCHION.

1,309,497. Specification of Letters Patent. Patented July 8, 1919.

Application filed September 19, 1916. Serial No. 120,963.

*To all whom it may concern:*

Be it known that I, GARRET H. WARD, a citizen of the United States, residing at Tillamook, in the county of Tillamook and State of Oregon, have invented certain new and useful Improvements in Cow-Stanchions; and I do hereby declare the following to be a full, clear, and exact description of the invention, such as will enable others skilled in the art to which it appertains to make and use the same.

This invention relates to a stanchion, and the primary object of the invention is to provide a stanchion which includes a pivotally mounted side bar which is adapted for movement into relatively close proximity to a rigid side bar of the stanchion for securely holding a cow while being milked or the like, and further to provide a flexible or rope stanchion structure which is carried by the side bar of the stanchion proper and is adapted for holding the cow when feeding, or when it is unnecessary to hold the cow securely in place.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a side elevation of the improved stanchion and showing the pivoted stanchion bar in an open position.

Fig. 2 is a view similar to Fig. 1 showing the pivoted stanchion bar in a closed position, and Fig. 3 is a vertical section through the stanchion.

Referring more particularly to the drawing, 1 designates the stall of a stable or other place in which the animal is housed which has sides 2 and 3 and a bottom 4. A top cross bar 5 is attached to the sides 2 and 3 of the stall 1 in any suitable manner as indicated at 6, and it is constructed of channeled iron. A bottom bar 7 is provided which is attached to the upper surface of the bottom 4 of the stall and also to the sides 2 and 3 as clearly shown at 8. A vertical rod 9 is rigidly connected to the cross bars 5 and 7 and extends at a slight angle from the perpendicular.

A bar or rod 10 is pivotally connected as shown at 11 to the lower cross bar 7. Spring catches 12 and 13 are carried by the top bar 5 which are adapted for engagement with the upper end of the pivoted side or pipe 10 of the stanchion for holding it in either of its adjusted positions. The catch 12 is provided for engaging the rod or bar 10 of the stanchion and holding it in a spread position with respect to the rod 9, while the catch 13 which is identical in construction with the catch 12 is provided for holding the rod 10 in its inward position as clearly shown in Fig. 1 of the drawing, when it is desired to securely hold the cow while being milked.

A flexible stanchion structure generically indicated by the numeral 14 is provided and it includes a pair of rings 15 and 16 which are slidably mounted upon the rods 9 and 10 respectively and which rings have relatively short lengths of ropes 17 connected thereto. The ropes 17 are also connected to a ring 18, which ring has ropes 19 and 20 connected thereto which are provided for extending about the neck of the cow for hitching her within the stall and permitting her to move freely about within the stall. A ring 21 is carried by the free end of the rope 19 and a snap hook 22 is carried by the free end of the rope 20, which snap hook and ring are provided for fastening the ropes 19 and 20 about the neck of the cow.

Hooks 23 are carried by the rods 9 and 10 and the ring 21 and snap hook 22 are attached to these hooks, when the pivoted stanchion bar 10 is positioned in its inward position.

The sliding arrangement of the rings 15 and 16 upon the bars 9 and 10, and the spread position of the bars will permit the cow to move freely about within the stall for the purpose of eating, or lying down.

In reducing the invention to practice, certain minor features of construction, combination and arrangement of parts may necessitate alteration to which the patentee is entitled provided such alterations are comprehended within the scope of what is claimed.

What is claimed is:—

1. In a stanchion structure, the combination, of an upper and lower cross bar, a substantially vertical bar rigidly connected to said top and bottom cross bars, a second bar pivotally connected to said bottom cross bar, and spring catches carried by said top cross bar for an engagement with the upper end of said pivoted bar for holding the pivoted bar in adjusted positions, rings slidably carried by said substantially vertical bar and the pivoted bar, a flexible rope connected to said rings and adapted for extending about an animal's neck, and means carried by the free ends of said rope for securing them together.

2. In a stanchion structure, the combination, of an upper and lower cross bar, a substantially vertical bar rigidly connected to said top and bottom cross bars, a second bar pivotally connected to said bottom cross bar, spring catches carried by said top cross bar for an engagement with the upper end of said pivoted bar for holding the pivoted bar in adjusted positions, rings slidably carried by said substantially vertical bar and the pivoted bar, a flexible rope connected to said rings and adapted for extending about an animal's neck, means carried by the free ends of said rope for securing them together, and hooks carried by said substantially vertical bar and the pivoted bar for engagement with said securing means when said rope is taken from about an animal's neck.

3. In a stanchion structure, the combination of an upper and a lower cross bar, a substantially vertical bar rigidly connected to said upper and lower bars, a second bar pivotally connected to said lower cross bar, means for securing said second bar in adjustment toward and away from the said vertical bar, and means carried by said bars adapted to be fastened about the neck of an animal for securing the animal to the bars.

4. In a stanchion structure, the combination of an upper and a lower cross bar, a substantially vertical bar rigidly secured between said cross bars, a bar pivotally connected to the bottom cross bar so as to be rockable toward and away from said substantially vertical bar, means for securing said pivotally mounted bar in adjustment about its axis, and means carried by said vertical bar and the pivotally mounted bar and freely slidable thereon adapted to be secured about the neck of an animal for attaching the animal to the said bars.

In testimony whereof I affix my signature in presence of two witnesses.

GARRET H. WARD.

Witnesses:
W. A. SNEDEKER,
GEO. J. LARSON.

Copies of this patent may be obtained for five cents each, by addressing the "Commissioner of Patents, Washington, D. C."